Patented Apr. 15, 1930

1,754,251

UNITED STATES PATENT OFFICE

JOHN W. YATES, OF MADISON, WISCONSIN, ASSIGNOR, BY MESNE ASSIGNMENTS, TO GENERAL LABORATORIES, INC., OF MADISON, WISCONSIN, A CORPORATION OF DELAWARE

PROCESS OF STERILIZATION

No Drawing.    Application filed May 9, 1928.   Serial No. 276,503.

This invention relates to the sterilizing of the surfaces of objects and apparatus employed in handling or treating milk, cream, butter, cheese or other beverages or foods, and more particularly to the sterilization of large surfaces of such objects and apparatus.

Prior to my invention there was no method or process known for this purpose, except the application of steam through a hose pipe in the ordinary and well known manner. Large utensils or containers, and large machines and apparatus for use in connection with milk, cream, butter, cheese and other beverages and foods, and for other purposes are too large ordinarily to admit of the possibility of filling them with a sterilizing liquid, or of treating them like ordinary milk cans, in which latter a relatively small amount of liquid may be placed, after which the cans may then be shaken or rolled about to bring about intimate contact of the liquid with all parts of the surfaces to be sterilized. Therefore, it has been the custom heretofore, in the sterilizing of large surfaces of objects or apparatus of this kind, to employ steam for sterilization by the use of a hose pipe or other suitable means. However, such steam is very often of low sterilizing quality, depending upon the distance from the boiler. Furthermore, the vapor which appears at the end of the hose nozzle and forms a large cloud, is not live steam, for live steam is not visible to the naked eye. Naturally, the ordinary plant workman, seeing this foggy condition or vapor settling on the surface of the big vats or the pasteurizer or on the surface of other objects or apparatus, thinks the work is being done in a proper manner, whereas in reality he is very often not effecting the sterilizing action in the required manner. Moreover, the damp steam fog which fills or clouds the whole plant, deposits moisture on the ceilings and other places, which gathers more bacteria and drips back upon the apparatus. Again, the steam in the plant atmosphere is so great as to obstruct the vision and impede work. In addition, the sterilizing of objects and apparatus of this kind by means of steam necessarily involves, in order to produce sufficient real live steam at the end of the hose pipe, the consumption of considerable fuel.

For example, in the operation of ordinary milk plants, such as creameries, condenseries, milk bottling plants, and other equipment of this kind, there are usually large machines which are permanently installed and on which there are large exposed areas, the principal areas being upright. Therefore, with such machines or apparatus, no method of soaking would be practicable. Such surfaces, particularly the surfaces of coolers, are usually quite cold and frequently involve areas 20 or 30 feet long and 10 or 12 feet high. Heretofore, the ordinary practice has involved the attachment of a steam hose to the steam connections of the building, thereby to blow so-called steam over the surfaces. Obviously, nothing but live steam could be effective in the destruction of the bacteria, but live steam is invisible, and ordinarily what the operator is applying is merely the condensation of live steam, as evidenced by the clouds of vapor. When such vapor strikes the cool surfaces of the metal of said machines or apparatus, or of any of the utensils or other objects to be sterilized, it instantly becomes little more than warm water and is entirely ineffective. Furthermore, in the process of cleaning these utensils and machines and apparatus with water and washing powders or other detergents, there is usually still left on the surfaces an almost invisible film of casein. After this washing process, the custom has been to apply the steam to the surfaces so washed and the effect of this is to harden upon the surfaces the thin film of casein, thus really protecting the contaminating bacteria which should be removed, and which is intended to be removed. Obviously, therefore, the steaming process is utterly unscientific and ineffective, the proof of which is shown by the every day experience of milk plants, inasmuch as more or less heavy bacterial contamination of the various products has been common.

The object of the invention, therefore, is to provide a novel and improved process or method for sterilizing the surfaces of the said objects and apparatus in question, by finely atomizing a dilute chlorine solution and permitting the same to settle upon the surfaces to be sterilized, thereby producing hypochlorous acid in effective strength to kill the germs, and to produce the desired results thus in effect providing a new method or process of sterilizing the surfaces of objects or apparatus for handling milk, cream, butter, cheese or other beverages or foods, or objects or apparatus for use in connection therewith, or for other purposes as a substitute for the ordinary method of sterilizing such surfaces by the use of steam, or other sterilizing methods.

To these and other useful ends, the invention consists in matters hereinafter set forth and claimed.

The invention can be practiced by the use of sterilizing liquids of various kinds. Preferably, the liquids for this purpose are solutions of sodium hypochlorite, potassium hypochlorite, calcium hypochlorite, magnesium hypochlorite, chlorine waters, or the chloramines. These preparations may be used as such or combined with the alkali hydroxides or alkali washing powders. The concentration of the active chlorine carrying compound is expressed in parts of available chlorine per million parts of water. While any dilute chlorine solution will do effective work, the best results, so far as now known, are obtained with neutral or nearly neutral solutions ranging from one hundred to five hundred parts of available chlorine per million parts of water.

Any suitable atomizing apparatus can be employed for atomizing the chlorine sterilizing liquid, and for spraying it upon the surfaces to be sterilized, such as hose pipes connected to the source of air pressure, it being important that the air pressure be sufficient to very thoroughly atomize the sterilizing liquid. It will be understood, of course, that atomizers of any suitable known or approved form or construction can be employed for this purpose, which may be conveniently handled and carried about from place to place in the beverage or food plant having the apparatus or equipment to be sterilized, or which can be so manipulated that all parts of the surface to be sterilized can be reached. In this way there is an economy in the use of fuel and sterilizing materials, as the atomizing jet can be brought close to the surfaces to be sterilized, or at least close enough to do the work effectively without unnecessarily filling the atmosphere with a cloud of vapor and without wasting the sterilizing liquid.

Moreover, it will be seen, in the process or method of thus atomizing and spraying the foregoing compounds or solutions, in dilute solution the chlorine carrying solution reacts with the carbondioxide of the air to liberate hypochlorous acid in effective strength to kill the germs which acid reacts more quickly with the organic matter upon the surfaces of the equipment or apparatus to be sterilized. In other words, the reaction is quicker and more effective than would be the case if the sterilizing liquid were simply poured over or upon the surfaces to be sterilized.

Therefore, in the process of spraying the chlorine carrying solution, for example, upon large vertical metal surfaces and utensils, machines or apparatus, what happens is this:

The condition of said surfaces may be in temperature either cold or hot. The chlorine carrying solution works with equal efficiency whether the surfaces are cold or hot. When the chlorine carrying solution is applied as a spray from the nozzle close to the surfaces to be treated, by atomization the chlorine of the solution re-acts with elements of the air and water, as stated, and the hypochlorous acid is not only highly destructive of bacteria, but also has a highly solvent action upon the almost invisible film of casein which is left on the utensils or apparatus after the regular cleaning process, and is an efficient slime dissolver. In this way, the film or slime is dissolved, and the bacteria are exposed and destroyed. Moreover, this method is highly economical, since a relatively small amount of chlorine carrying solution is required to thoroughly treat a large amount of surface, and there is further economy in the fact that no temperature controls are necessary. In fact, efficiency and cleanliness are brought about throughout the milk plant, or beverage or food plant, owing to the fact that there is no cloud of steam in the plant, and in addition, there is no deterioration of the side walls and ceilings in the building, and no contamination of the utensils and apparatus or other objects.

It will be seen, therefore, that the invention is essentially a new method of sterilizing the surfaces of beverage or food apparatus or equipment, or apparatus or utensils or objects for sterilization or other purposes by atomizing and spraying a chlorine atomizing liquid or solution upon the surfaces to be sterilized, and is more specifically a substitute for the ordinary steam method of sterilizing surfaces of this kind, which latter method has been found to be ineffective and deceptive for various reasons.

The words "sterilize" and "sterilizing" are here used in the sense in which they are used and understood by all practical men in the milk industry, meaning "practical sterilization"—that is to say, the bacteriological influence is rendered negligible by the process.

Therefore, as previously stated, and while the sterilization of milk plants and apparatus and utensils has been described, it will be understood that this is merely illustrative of one use of this invention, and that the invention can be used for the sterilization of all sorts of things that are necessary in the production and handling of beverages and foods, without departing from the spirit of the invention. It will be observed that, in the practice of the invention, the hypochlorous acid must be formed in effective strength for the purpose set forth, as for the killing of the germs, or the dissolving of the film of slime on the surfaces of apparatus or utensils to be sterilized, and for this practice it is found that the more dilute the chlorine carrying solution is, within limits when atomized, the more hypochlorous acid is produced in effective strength to accomplish the desired purpose.

Without disclaiming anything, and without prejudice to any novelty disclosed, what I claim as my invention is:

1. A process of disinfecting or sterilizing surfaces which consists in applying a dilute solution containing available chlorine by atomizing the same whereby the carbon dioxide in the atmosphere reacts with the solution to form hypochlorous acid in effective strength for the purpose set forth.

2. A process of disinfecting or sterilizing surfaces which consists in applying a hypochlorite in dilute solution containing from one hundred to five hundred parts of available chlorine per million parts of water by atomizing the solution in applying the same whereby the carbon dioxide in the atmosphere reacts with the hypochlorite solution to form hypochlorous acid in effective strength for the purpose set forth.

3. A process of disinfecting or sterilizing surfaces which consists in applying a dilute solution of sodium hypochlorite containing from one hundred to five hundred parts of available chlorine per million parts of water by atomizing the solution in applying the same whereby the carbon dioxide in the atmosphere reacts with the hypochlorite solution to form hypochlorous acid in effective strength for the purpose set forth.

4. The process of disinfecting or sterilizing surfaces, as a substitute for steam, which consists in diluting a hypochlorite and in atomizing the solution in applying it to the surface whereby the carbon dioxide in the atmosphere reacts with the hypochlorite solution to form hypochlorous acid in effective strength for the purpose set forth.

Specification signed this 4th day of May, 1928.

JOHN W. YATES.